March 20, 1951  G. C. ARMSTRONG  2,545,984
PROTECTIVE RELAY FOR ALTERNATING CURRENT
Filed May 24, 1949  2 Sheets-Sheet 1
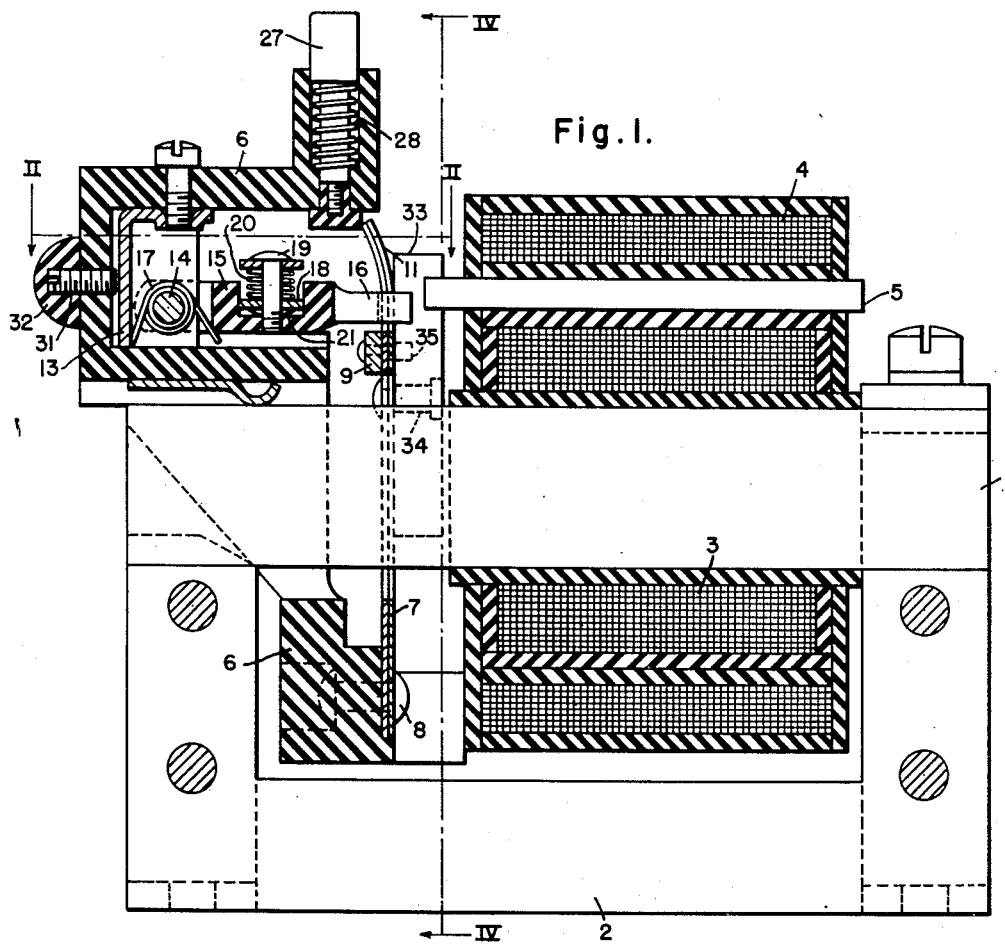
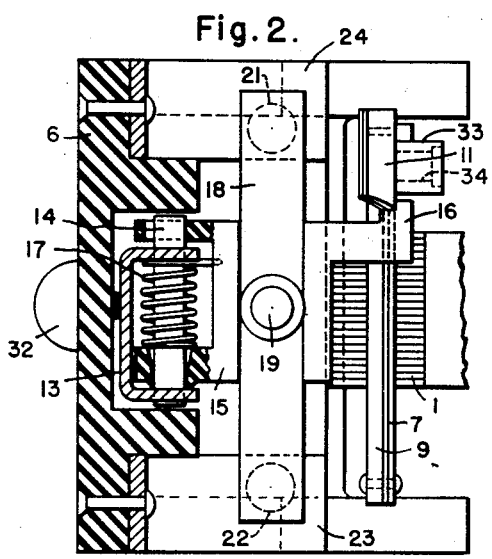
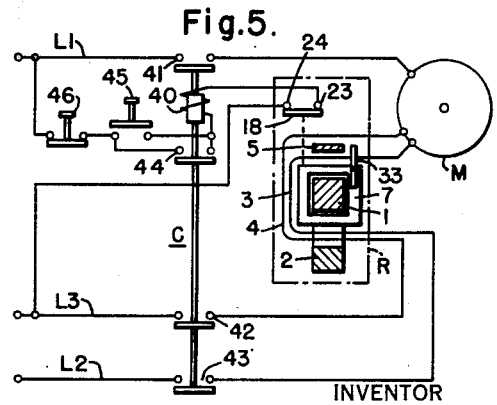
INVENTOR
GEORGE C. ARMSTRONG
BY
ATTORNEY March 20, 1951 G. C. ARMSTRONG 2,545,984
PROTECTIVE RELAY FOR ALTERNATING CURRENT
Filed May 24, 1949 2 Sheets-Sheet 2

WITNESSES:
Edward Michaels
New. C. Goodie

INVENTOR
GEORGE C. ARMSTRONG.
BY
ATTORNEY

Patented Mar. 20, 1951

2,545,984

UNITED STATES PATENT OFFICE 2,545,984

PROTECTIVE RELAY FOR ALTERNATING CURRENT

George C. Armstrong, Buffalo, N. Y., assignor to Westinghouse Electric Corporation, East Pittsburgh, Pa., a corporation of Pennsylvania Application May 24, 1949, Serial No. 94,977

9 Claims. (Cl. 200—88)

My invention relates to relays for protecting alternating-current circuits and apparatus from overloads, unbalanced load conditions, or the like detrimental irregularities.

It is among the objects of my invention to provide protective relays with thermally responsive release means, such as bimetal members, that operate as their own heat source but are insulated from the load circuit to be protected, and that readily permit being controlled by either one or any number of phase currents of a polyphase load circuit.

Another object of the invention is to devise a protective relay which, though connected in only two lines of a three-phase load circuit, affords protection from overload as well as from load unbalance due to opening of any one of the three primary lines of a transformer supplying the load current.

These and other objects as well as the means, set forth in the annexed claims, for achieving these objects in accordance with the invention, will be apparent from the following description of the protective relay exemplified by the drawings.

Figure 1 shows a sectional elevation of the relay.

Fig. 2 is a part-sectional view, the section being taken along the plane denoted by line II—II in Fig. 1.

Fig. 5 is a circuit diagram of the relay in connection with a contactor for a three-phase motor.

Figure 6:
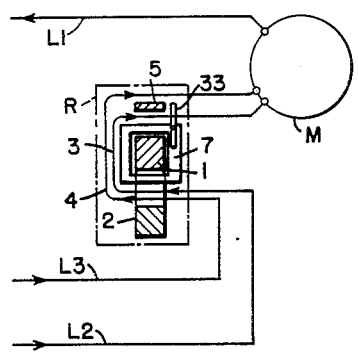
Figs. 6 and 7 are schematic and relate to the same relay.

According to Figures 1 to 4, the illustrated relay has a magnetizable structure composed of a main core portion 1 and a yoke portion 2 which are composed of laminated material and form together a closed magnetic circuit. The main core 1 is equipped with two coils 3 and 4. Both coils surround the core, and when in operation, are connected in two respective lines of the three-phase load circuit (see Fig. 5). In the illustrated embodiment, the two coils are substantially concentric. Inserted between coils 3 and 4, is an auxiliary magnetizable core 5. The dimensions of the auxiliary core are relatively small as compared with the main core 1, and the auxiliary core is located on only one side of the coil center. The width of the auxiliary core is only a small fraction of the coil periphery. Consequently, the magnetic reluctance of core 5 is high compared with the main core 1.

Mounted on the magnetic main structure, is an insulating base 6, preferably of molded material. A bimetal member 7 is firmly secured to the base 6 by means of screws or rivets 8 so that its opposite side is capable of thermo-responsive deflection away from the coils when the bimetal member is heated. A cross bar 9 (Figs. 1, 2) fastened to the bimetal member 7 serves to decrease the electrical resistance at the restricted section of the member. The member 7 has a large center hole and surrounds the main core 1. It will be recognized that the main core with coils 3, 4 and the loop-shaped bimetal member represent a transformer whose primary windings are constituted by the coils, while the secondary winding consists of the bimetal loop member. Consequently, when either or both coils are traversed by load current, a secondary current is induced in the bimetal member and has the effect of heating this member. When the secondary current, and hence the primary load current, reaches an excessive magnitude, the thermo-responsive deflection of the bimetal member 7 becomes large enough to actuate or release a contact device described in a later place.

Figure 3:
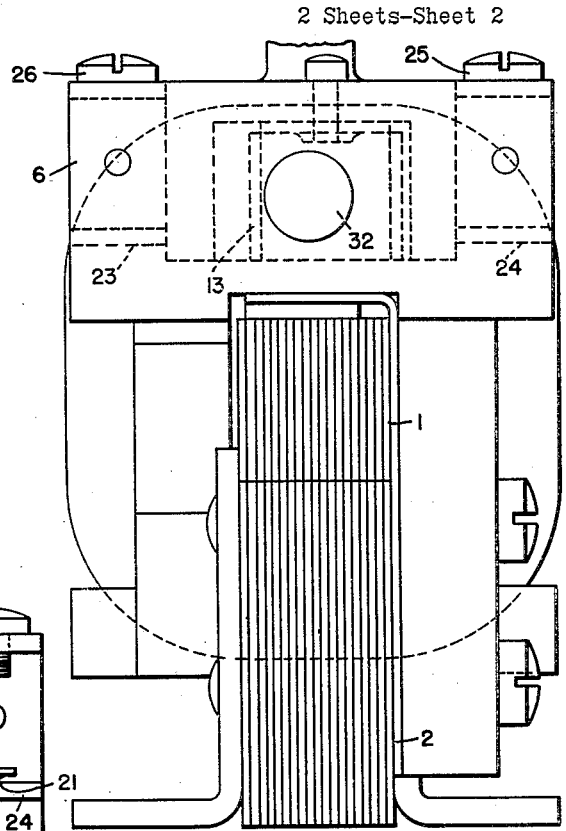
Fig. 3 is a front view seen from the left of Fig. 1.

The bimetal member 7 is equipped with a nose or catch member 11 which, preferably, forms an integral part of the member. Fastened to the insulating base 6, is a bracket 13 (Figs. 1, 2) which carries a pivot pin 14 for an insulating contact arm 15. The arm 15 has a latch projection 16 engageable by the nose or catch portion 11 of the bimetal member 7 (Fig. 2). The contact arm 15 is not only angularly movable about the axis of pivot pin 14, but may also tilt clockwise about the lower end of pin 14, as shown in Fig. 2. For this purpose, the pivot surfaces of the arm 15 that engage the pin 14 are shaped with sufficient clearance to permit the just-mentioned shifting movement within the required limits. A biasing spring 17 seated on pin 14 tends to move the arm 15 upward relative to the illustration of Fig. 1, and it also biases the arm 15 counterclockwise toward the position illustrated in Fig. 2. A contact bar 18 is attached to the arm 15 by means of a pin 19 and is biased toward the arm 15 by a contact pressure spring 20 (Fig. 1). The bar 18 carries contacts 21, 22 (Figs. 2, 4) which in the illustrated position of the arm 15 are in engagement with respective stationary contacts 23 and 24. Two terminals 25 and 26 are electrically connected with the stationary contacts 23 and 24, respectively (Figs. 3, 4).

Figure 4:
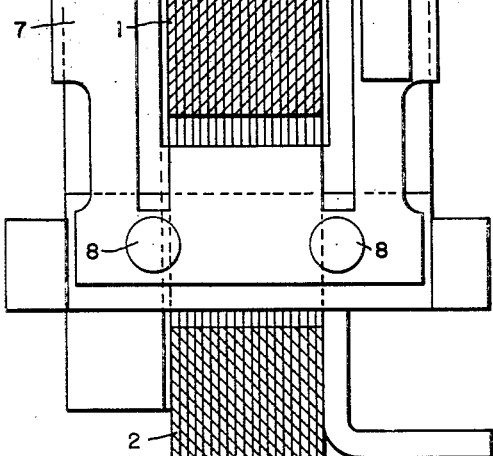
Fig. 4 is a sectional view from the right of Fig. 1, the section being taken along line IV—IV in Fig. 1.

When the switch arm 15 is in the illustrated latched position, the contact bar 18 closes the circuit between the stationary contacts 23 and 24 (see Figs. 4, 5). When the bimetal member 7—due to abnormal current conditions in the circuit of coils 3 and 4—deflects away from the coils, the catch 11 releases the latch 16 of the contact arm 15 so that the biasing spring 17 becomes effective to open the circuit, thus initiating the protective operation for which the relay is intended.

Movably mounted in the insulating base 6, is a reset button 27 and a return spring 28 which holds the button 27 in the position shown in Fig. 1. After the switch arm 15 is released for opening the relay contact, the arm and contact can be reset to the illustrated switched-in position by depressing the button 27. The lower end of the reset button then engages the arm 15 and returns it into latching engagement with the bimetal member. An adjusting screw 31, in threaded engagement with the insulating base 6, permits an accurate thermal calibration of the relay by forcing the bracket 13 and the arm 15 more or less toward the bimetal member, thus permitting a variation of the length of deflective travel necessary for the catch 11 of the bimetal member to release the relay contact means. Once the screw 31 is properly adjusted by the manufacturer, no further calibration is needed. Therefore, the screw 31 is covered by a protective knob 32 of cement or the like material.

As will be explained below, the above-mentioned thermo-responsive release of the relay contact means is due only to the inductive effect of the transformer of which the main core 1 forms part, but is practically not affected by the magnetic condition of the auxiliary core 5. However, the relay is also equipped with magnetic releasing means which are controlled by the magnetic condition of the core 5. These magnetic releasing means consist essentially in an armature 33 which is pivoted about a pin 34 attached to the bimetal member 7 (Figs. 1, 2, 4). As is best apparent from Fig. 4, the lower arm of the armature 33 lies within the stray field of the main core 1. The upper arm of the armature also lies in the field of the auxiliary core 5 (see Fig. 1). Whenever the main core 1 is appreciably magnetized, this being the case under balanced load conditions and also under some specific unbalanced conditions, its attraction of the armature dominates over the attractive effect of the auxiliary core 5 so that, relative to the illustration in Fig. 4, the armature 33 is usually magnetically biased by the main core 1 in the clockwise direction, i. e., away from the latch 16 of contact arm 15. The clockwise armature movement toward the main core 1, however, is limited by a stop 35 (Figs. 1, 4). As will be explained, under certain disturbance conditions the magnetization of the main core 1 drops considerably or practically vanishes, while the auxiliary core 5 becomes more strongly magnetized. Then the auxiliary core 5 attracts the armature 33 and moves it toward the latch 16 of contact arm 15. With reference to Fig. 2, this magnetically controlled movement is substantially parallel to the axis of the pivot pin 14. As a result, the latch member 16 is tilted downwardly, still referring to Fig. 2, until it is released from the catch 11 so that the relay contact is opened.

The performance and advantages of the above-described relay will be best understood from an example of application, for instance, as represented in Fig. 5.

According to Fig. 5, a three-phase motor M is connected to the three lines L1, L2, L3 of an alternating-current circuit through the main contacts 41, 42, 43 of a contactor C whose coil 40 also controls a self-sealing contact 44. The circuit for contactor coil 40 is energized from lines L1 and L3 through a normally open start contact 45 and a normally closed stop contact 46. The coil circuit also extends through the stationary contacts 23, 24 and the movable contact bar 18 of a protective relay designed in accordance with Figs. 1 through 4 which is denoted in Fig. 5 by R. The two cores 1, 5 and two coils 3, 4 of the relay and the bimetal member 7 with the magnetic armature 33 are represented schematically.

It will be recognized from Fig. 5, that coil 3 surrounds only the main core 1 but not the auxiliary core 5, while coil 4 surrounds both cores. Under normal three-phase operating conditions, both coils are traversed by current and their polarity of connection is such that they act cumulatively on the main core 1. Consequently, when an overload occurs while the circuit remains balanced, both coils cooperate in inducing a secondary heating current in the bimetal member 7, thus causing it to thermally release the relay contact. When any one of the circuit leads becomes interrupted between the motor and the appertaining power transformer, at least one of the two coils remains in the live circuit thus also causing the bimetal member to release the relay contact either while the motor keeps running under an overload or when the next attempt is made to start the motor under single-phase energization.

The invention also affords an outstanding advantage in the event of faults of the following nature. When the motor or other load is energized from a power transformer and a phase opening occurs in any one of the primary transformer leads, the secondary load circuit remains energized by single-phase voltage although all of its three leads continue to carry current. It has been a problem to provide protection for such contingencies. Only if three relays or relay coils were connected in the three respective leads of the load circuit, was it possible to automatically open the load circuit in response to interruption of any one of the primary transformer leads. No satisfactory protection, however, could be obtained in protective relays which, for the sake of a simpler and less space-consuming design, have a lesser number of coils than the number of phase leads. In contrast thereto, a relay according to the invention secures satisfactory protection also for the just-mentioned contingencies.

Assume that the lines L1, L2 and L3 of the circuit shown in Fig. 5 are connected to a wye-delta or delta-wye power transformer and that one of the primary transformer leads is interrupted. Then the lines L1, L2 and L3 of the load circuit are supplied by single-phase current with two parallel currents flowing in any two lines and returning through the third line. Fig. 6 represents schematically a case in which the single-phase current from the transformer flows in parallel through the two coil lines L2 and L3 and returns through the non-relayed line L1. This flow of current is indicated in Fig. 6 by arrowheads. It will be recognized that under the just-mentioned conditions the two coils 3 and 4 act cumulatively on the main core 1, but substantially balance each other relative to the auxiliary core 5. Consequently, the main core 1 becomes more strongly magnetized and causes the bimetal member 7 to trip the relay contact.

Figure 7:
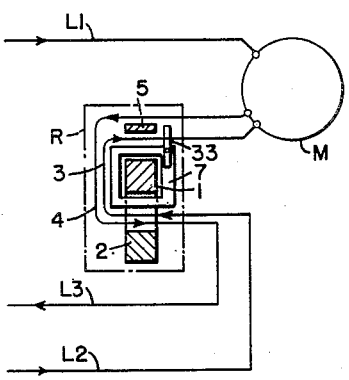

Fig. 7 represents the other possibility in which parallel currents flow through one coil line and the unrelayed line, and return through the other coil line. This current flow is again indicated by arrowheads. Under these conditions, the currents in coils 3 and 4 counteract and at least partially balance each other as regards the main core 1, but act cumulatively on the auxiliary core 5. This is apparent from the fact that the currents now flowing on the two sides of the auxiliary core 5 have opposing directions; while under the conditions previously considered, they had the same directions. Thus the field of auxiliary core 5 becomes strong enough to actuate the armature 33, thereby releasing the relay contact.

It will be recognized from the foregoing description and the drawings that a loop-shaped bimetal member operating as the secondary of a transformer whose primary coils are traversed by the load current, represents its one source of heat, is electrically insulated from the load circuit, and can readily be associated with one or any number of relay coils, all acting on the same bimetal member. It will be understood by those skilled in the art that this feature of the invention can be applied to relays of designs and for purposes other than those specifically exemplified in this disclosure.

It will also be recognized that the essential feature of my invention of having two magnetizable cores surrounded by one coil but only one of them surrounded by another coil, and having inductively associated with each core a control means for controlling the relay contact, is not necessarily predicated upon the illustrated concentric arrangement of the coils but permits various modifications in arrangement and design within the spirit of the invention and without departing from its features as set forth by the claims annexed hereto.

I claim as my invention:

1. A protective relay for three-phase circuits, comprising a magnetizable main core, two coils of which one surrounds the other on said main core for connection in two respective circuit phases, an auxiliary magnetizable core disposed between said two coils, releasable contact means, a thermo-deflective member inductively coupled with said main core to be heated by current induced by said coils, said member being engageable with said contact means for releasing said contact means in response to given circuit conditions, and a magnetizable armature inductively associated with said auxiliary core and engageable with said contact means for releasing said contact means in response to another given circuit condition.

2. A protective relay for three-phase circuits, comprising a magnetizable main core, two coils of which one surrounds the other on said main core for connection in two respective circuit phases, an auxiliary magnetizable core disposed between said two coils, releasable contact means, a bimetal member surrounding said main core and forming a secondary winding to be heated by current induced in said member by said coils, said member being engageable with said contact means for releasing said contact means in response to given circuit conditions, and a magnet armature inductively related to said auxiliary core for releasing said contact means in response to another given circuit condition.

3. A protective relay for three-phase circuits, comprising a magnetizable main core, two coils of which one surrounds the other on said main core for connection in two respective circuit phases, an auxiliary magnetizable core disposed between said two coils, releasable contact means, a bimetal member surrounding said main core and forming a secondary winding to be heated by current induced in said member by said coils, said member being engageable with said contact means for releasing said contact means in response to given circuit conditions, a magnet armature movably mounted on said member and disposed in inductive relation to said auxiliary core, said armature being engageable with said contact means for releasing said contact means in response to another given circuit condition.

4. A protective relay for three-phase circuits, comprising a magnetizable main core, two coils of which one surrounds the other on said main core for connection in two respective circuit phases, an auxiliary magnetizable core disposed between said two coils, releasable contact means, a bimetal member surrounding said main core and forming a secondary winding to be heated by current induced in said member by said coils, said member being engageable with said contact means for releasing said contact means in response to given circuit conditions, a magnet armature pivotally mounted on said member at a pivot point between said two cores, said armature being movable between said two cores and movable between two positions toward one and the other core respectively so as to be attracted toward said main core when said coils act cumulatively on said main core and toward said auxiliary core when said coils act differentially on said main core, said armature being engageable with said contact means for releasing said contact means in response to armature movement toward said auxiliary core.

5. A protective relay for polyphase alternating-current circuits, comprising a magnetizable main core and a magnetizable auxiliary core, two primary coils for connection with two respective circuit phases, one of said coils surrounding only said main core, said other winding surrounding both said cores so that said main core is normally cumulatively excited by said two coils and said auxiliary core is appreciably excited only under reverse-flow current conditions of either coil, a relay contact means, secondary winding means surrounding said main core and operatively associated with said contact means for controlling said contact means in response to excessive current induced by said coils in said winding means, and a magnet armature inductively related to said auxiliary core for controlling said contact means in response to said conditions.

6. A protective relay for polyphase alternating-current circuits, comprising a magnetizable main core and a magnetizable auxiliary core, two primary coils for connection with two respective circuit phases, one of said coils surrounding only said main core, said other winding surrounding both said cores so that said main core is normally cumulatively excited by said two coils and said auxiliary core is appreciably excited only under reverse-flow current conditions of either coil, a deflectively mounted bimetal member shaped as a closed loop and surrounding said main core to be heated by current induced in said member by said coils, a movable armature member magnetically associated with said auxiliary core, and contact means in connection with said members to be controlled by movement of said respective members.

7. A protective relay for polyphase alternating-current circuits, comprising a magnetizable main core and a magnetizable auxiliary core, two primary coils for connection with two respective circuit phases, one of said coils surrounding only said main core, said other winding surrounding both said cores so that said main core is normally cumulatively excited by said two coils and said auxiliary core is appreciably excited only under reverse-flow current conditions of either coil, a deflectively mounted bimetal member shaped as a closed loop and surrounding said main core to be heated by current induced in said member by said coils, an armature having a pivot mounted on said member and having two arms opposite said pivot magnetically associated with said respective cores so as to be normally attracted toward said main core and movable toward said auxiliary core in response to said conditions, and contact means having a spring-biased contact and latching means for normally holding said contact against its bias, said member and armature being engageable with said latching means for releasing said contact.

8. A protective relay for polyphase alternating-current circuits, comprising a magnetizable main core and a magnetizable auxiliary core, two primary coils for connection with two respective circuit phases, one of said coils surrounding only said main core, said other winding surrounding both said cores so that said main core is normally cumulatively excited by said two coils and said auxiliary core is appreciably excited only under reverse-flow current conditions of either coil, a deflectively mounted bimetal member shaped as a closed loop and surrounding said main core to be heated by current induced in said member by said coils, a movable armature magnetically associated with said auxiliary core to change its position in response to said condition, contact means having a contact arm and a pivot mounting permitting angular and axial movements of said arm and having a biasing spring tending to hold said arm in a given angular and axial position, said bimetal member having a nose engageable with said contact member to normally latch said arm in said position, and said armature being movable substantially parallel to said axial movement for displacing said arm out of engagement with said nose when said armature is attracted by said auxiliary core.

9. A protective relay, comprising a magnetizable structure forming a closed magnetic circuit and having a core portion, two coils mounted on said core portion, one of said coils surrounding the other, a thermo-deflective bimetal winding member surrounding said core portion to be heated by current induced by said coils in said member, an auxiliary core extending between said two coils and parallel to said core portion and having smaller cross section and higher magnetic reluctance than said core portion, a magnetic armature normally biased away from said auxiliary core and movable toward said auxiliary core when the latter is sufficiently magnetized due to given current conditions of said coils, and normally latched contact means releasably connected with said member and said armature to be tripped by deflective movement of said member and attraction movement of said armature respectively.

GEORGE C. ARMSTRONG.

REFERENCES CITED

The following references are of record in the file of this patent:

UNITED STATES PATENTS

| Number | Name | Date |
| --- | --- | --- |
| 1,652,346 | Burnham | Dec. 13, 1927 |
| 1,692,486 | Cohn | Nov. 20, 1928 |
| 1,726,424 | Churcher | Aug. 27, 1929 |
| 1,728,551 | Jennings | Sept. 17, 1929 |

FOREIGN PATENTS

| Number | Country | Date |
| --- | --- | --- |
| 47,306 | Norway | Sept. 28, 1931 |
| 462,545 | Germany | July 1, 1928 |
| 563,000 | Germany | Oct. 31, 1932 |

OTHER REFERENCES

McClain (Abstract) Ser. No. 527,521, published in O. G. July 12, 1949, page 636.